United States Patent
Raju et al.

(10) Patent No.: US 8,655,998 B1
(45) Date of Patent: Feb. 18, 2014

(54) CLIENT-SIDE XML-BASED DEVELOPMENT ENVIRONMENT FOR NETWORK DEVICE MANAGEMENT APPLICATIONS

(75) Inventors: Satyanarayana Raju, Union City, CA (US); Christopher Norris, San Jose, CA (US); Lei Yuan, Nepean (CA); David Anthony Tanner, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 2339 days.

(21) Appl. No.: 10/727,153

(22) Filed: Dec. 2, 2003

(51) Int. Cl.
*G06F 15/173* (2006.01)
*G06F 15/16* (2006.01)
*H04L 29/08* (2006.01)

(52) U.S. Cl.
CPC ... *H04L 29/08072* (2013.01); *Y10S 707/99953* (2013.01); *Y10S 707/99954* (2013.01)
USPC ........... 709/223; 709/217; 709/218; 709/219; 709/220; 709/221; 709/222; 709/224; 709/225; 709/226; 709/227; 709/228; 709/229; 707/999.202; 707/999.203; 717/104; 717/105; 717/106; 717/107; 717/108; 717/109; 717/110; 717/111; 717/112; 717/113; 717/114; 717/115; 717/120; 717/121; 719/313; 719/315; 719/316; 719/320; 719/328; 719/329; 719/330; 719/331; 719/332

(58) Field of Classification Search
USPC ......... 709/219, 223, 220, 217, 218, 221, 222, 709/224, 225, 226, 227, 228, 229; 707/100–104, 999.202, 999.203; 717/104, 105, 106, 107, 108, 109, 110, 717/111, 112, 113, 114, 115, 120, 121; 719/313, 315, 316, 320, 328, 329, 330, 719/331, 332
See application file for complete search history.

(56) References Cited

U.S. PATENT DOCUMENTS

| | | | |
|---|---|---|---|
| 6,490,564 B1 * | 12/2002 | Dodrill et al. | 704/275 |
| 6,510,434 B1 * | 1/2003 | Anderson et al. | 707/100 |
| 6,697,805 B1 * | 2/2004 | Choquier et al. | 707/10 |
| 6,704,752 B1 | 3/2004 | Kathail et al. | |
| 6,704,864 B1 | 3/2004 | Philyaw | |
| 6,718,371 B1 * | 4/2004 | Lowry et al. | 709/213 |
| 6,766,298 B1 * | 7/2004 | Dodrill et al. | 704/270.1 |
| 6,806,890 B2 * | 10/2004 | Audleman et al. | 715/762 |
| 6,826,597 B1 * | 11/2004 | Lonnroth et al. | 709/207 |
| 6,985,905 B2 * | 1/2006 | Prompt et al. | 707/102 |
| 7,028,312 B1 * | 4/2006 | Merrick et al. | 719/330 |
| 7,072,946 B2 * | 7/2006 | Shafer | 709/217 |
| 7,111,206 B1 * | 9/2006 | Shafer et al. | 714/48 |

(Continued)

*Primary Examiner* — Saket K Daftuar
(74) *Attorney, Agent, or Firm* — Hickman Palermo Truong Becker Bingham Wong LLP

(57) ABSTRACT

An end-to-end approach is provided for developing and maintaining network device management applications. The approach includes an XML-based development environment for network device management applications that uses Management Data API (MDA) schemas that define a hierarchical data model for components supported by a network device. The XML-based development environment also uses XML schemas to define a common XML-based interface used by management applications to access management data maintained on the network device. The approach provides programmatic access to network device management data and management data schema with an XML-based data model and interface that is consistent across all network device components. The approach includes mechanisms for automatically generating XML requests that conform to a hierarchical data model from requests that conform to a table-based data model. The approach also includes mechanisms for automatically extracting data from XML replies and conforming to the table-based data model.

18 Claims, 5 Drawing Sheets

(56) References Cited

U.S. PATENT DOCUMENTS

| | | | |
|---|---|---|---|
| 7,120,678 B2* | 10/2006 | Greuel | 709/220 |
| 7,130,870 B1 | 10/2006 | Pecina et al. | |
| 7,171,415 B2* | 1/2007 | Kan et al. | 707/10 |
| 7,177,859 B2* | 2/2007 | Pather et al. | 1/1 |
| 7,197,700 B2* | 3/2007 | Honda et al. | 715/207 |
| 7,313,608 B1* | 12/2007 | Swedor et al. | 709/221 |
| 2002/0161861 A1* | 10/2002 | Greuel | 709/220 |
| 2003/0135842 A1* | 7/2003 | Frey et al. | 717/121 |
| 2003/0172196 A1* | 9/2003 | Hejlsberg et al. | 709/328 |
| 2003/0204579 A1* | 10/2003 | Lutz | 709/223 |
| 2004/0010510 A1* | 1/2004 | Hotti | 707/103 R |
| 2004/0236858 A1* | 11/2004 | Schwartz | 709/230 |
| 2005/0114378 A1* | 5/2005 | Elien et al. | 707/102 |

* cited by examiner

CLIENT-SIDE XML-BASED DEVELOPMENT ENVIRONMENT FOR NETWORK DEVICE MANAGEMENT APPLICATIONS

RELATED APPLICATIONS

This application is related to U.S. patent application Ser. No. 10/727,135, filed Dec. 2, 2003, entitled SERVER-SIDE XML-BASED DEVELOPMENT ENVIRONMENT FOR NETWORK DEVICE MANAGEMENT APPLICATIONS, which is incorporated herein by reference in its entirety.

FIELD OF THE INVENTION

This invention relates generally to networking, and more specifically, to a development environment for network device management applications.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many network devices, such as routers, gateways and hubs, have grown significantly in complexity in recent years. For example, some routers now include sophisticated multi-processor computing platforms and support a wide variety of components. Example components include, without limitation, interior and exterior routing protocols, such as open shortest path first (OSPF) and border gateway protocol (BGP), respectively, access control lists (ACLs), inventory and resource reservation setup protocol (rsvp). One of the issues with these sophisticated network devices is that different components supported by the network devices have their own application program interfaces (APIs) and data models. Thus, each component has its own command line interface (CLI) that is used to configure the component. This situation typically occurs when components are separately developed and maintained by different design teams and vendors, who use their own APIs and data models for their respective components.

The use of different APIs and data models across components within network devices increases the cost of developing and maintaining network devices since each component has its own API and data model that are not easily shared or re-used across components. This situation also increases the time and expense to develop and maintain management applications because the management applications must support all of the different APIs and data models for the components supported by the network devices. Each change in a component API or data model necessitates a re-building of management applications that manage the changed component.

Manually creating and editing network device configuration data is tedious and prone to errors, particularly for network devices that use large amounts of configuration data. The file containing all of the configuration data for the network device must be downloaded and then manually edited. There are also situations where it is desirable to reuse configuration data across multiple network devices, for example when a large number of identical network devices are deployed. Using conventional editing tools to create multiple copies of configuration data and then to customize the configuration data for particular network devices is also tedious and prone to errors.

Based on the foregoing, there is a need for an approach for developing APIs for network devices that does not suffer from limitations of prior approaches. There is a particular need for an approach for simplifying the development of APIs for network devices. There is a further need for an approach for simplifying the development and maintenance of APIs for network device management applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. XML-BASED DEVELOPMENT ENVIRONMENT
III. MDA DESIGN PHASE
IV. CLIENT INTERFACE DESIGN PHASE
V. CLIENT RUNTIME
VI. ROUTER RUNTIME
VII. OTHER SERVICES
VIII. IMPLEMENTATION MECHANISMS

I. Overview

An end-to-end approach is provided for developing and maintaining network device management applications. The approach includes an XML-based development environment for network device management applications that uses Management Data API (MDA) schemas that define a hierarchical data model for components supported by a network device. The XML-based development environment also uses XML schemas to define a common XML-based interface used by management applications to access management data maintained on the network device. The approach provides programmatic access to network device management data and management data schema with an XML-based data model and interface that is consistent across all network device components. The approach includes mechanisms for automatically generating XML requests that conform to a hierarchical data model from requests that conform to a table-based data model. The approach also includes mechanisms for automatically extracting data from XML replies and conforming to the table-based data model. These features reduce the amount of time and resources required to develop and maintain network device management applications.

II. XML-Based Development Environment

Figure 1:
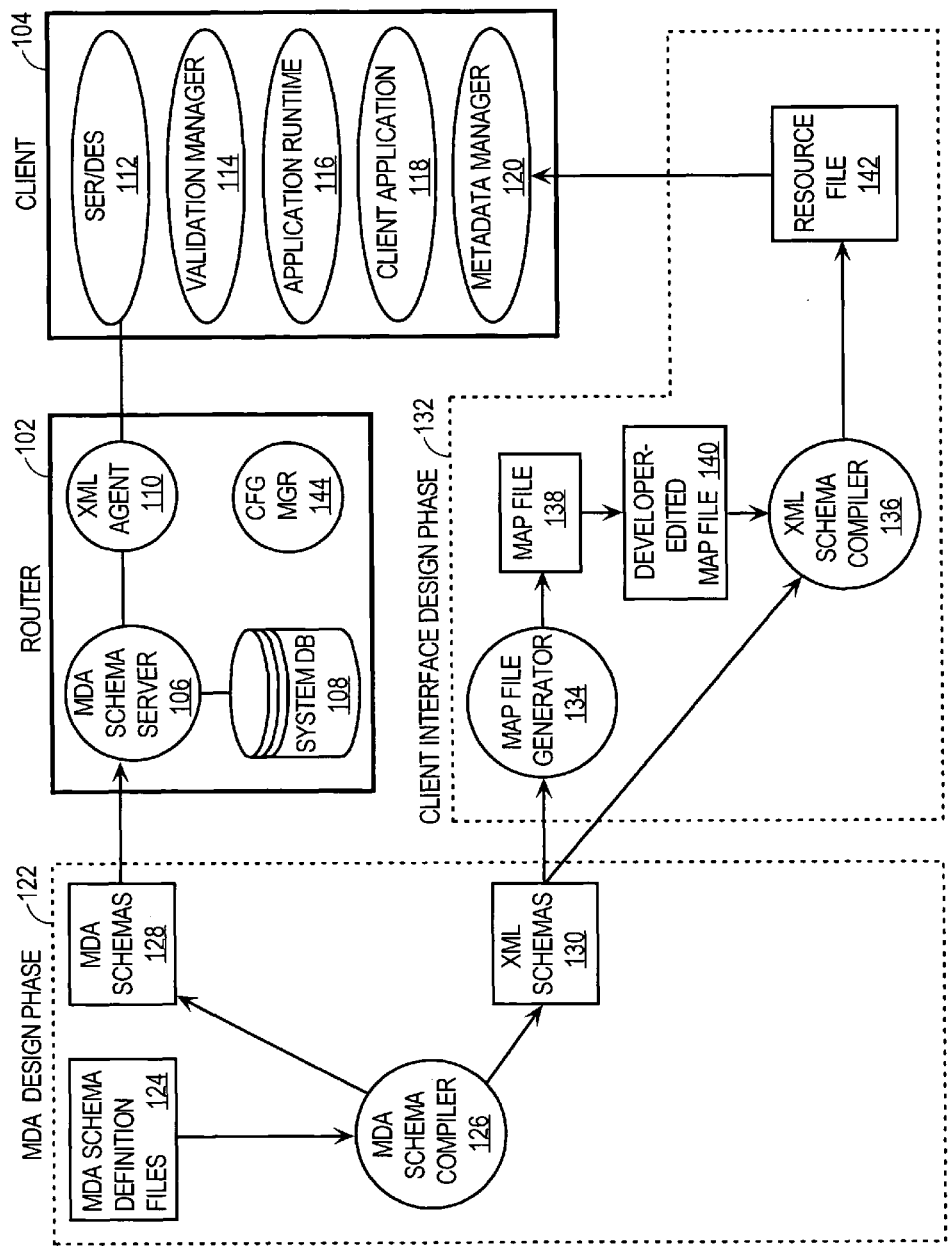
FIG. 1 is a block diagram that depicts an XML-based development environment for network device management applications according to an embodiment of the invention.

FIG. 1 is a block diagram that depicts an XML-based development environment for network device management applications according to an embodiment of the invention. The environment includes a router 102 communicatively coupled to a client 104. Embodiments of the invention are described herein in the context of a router for purposes of explanation only and the approaches described herein are applicable to other types of network devices. Router 102 and client 104 may reside at the same physical location or may be located apart, depending upon the requirements of a particular application.

Router 102 includes a management data API (MDA) schema server 106 communicatively coupled to a system database (DB) 108 and an XML agent 110. MDA schema server 106 manages MDA schemas maintained on router 102 and provides MDA schema information to XML agent 110.

System DB 108 stores management data for router 102. The management data may include any type of data that is relevant to managing router 102. Examples of management data include, without limitation, component configuration data and operational data. According to one embodiment of the invention, management data is stored on system DB 108 in a hierarchical structure, which is described in more detail hereinafter.

XML agent 110 handles communications between router 102 and client 104. For example, XML agent 110 processes client requests from client 104 and makes requests to MDA schema server 106. According to one embodiment of the invention, XML agent 110 provides communications with client 104 using common object request broker architecture (CORBA), but the invention is not limited to the CORBA context. In the CORBA context, client 104 is configured with a CORBA client. Router 102 may include other types of agents to support other transports, for example SSH and Telnet.

Client 104 includes a serialization/deserialization (SER/DES) module 112, a validation manager 114, a application runtime 116, one or more client application 118 and a metadata manager 120. These elements are described in more detail hereinafter.

III. MDA Design Phase

The MDA design phase is graphically represented in FIG. 1 by the box identified by reference numeral 122. The first step in the MDA design phase 122 is the creation of MDA schema definition files 124 that define an XML-based hierarchical data model for the components supported by router 102. As described in more detail hereinafter, MDA schema definition files 124 also define a common XML interface used by management applications to access management data maintained on router 102.

Figure 2:
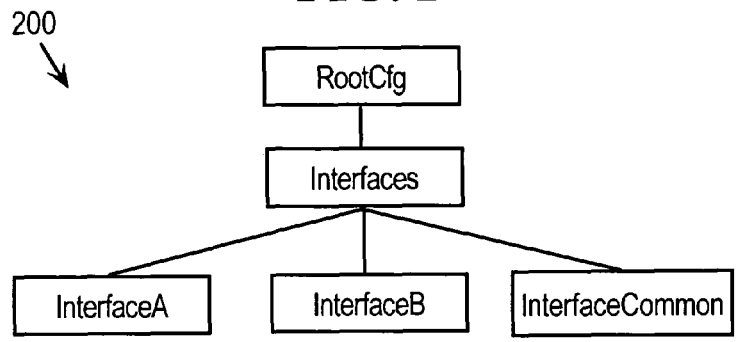
FIG. 2 is a block diagram that depicts a graphical representation of a hierarchical data structure in the form of a tree.

According to one embodiment of the invention, MDA schema definition files 124 define a hierarchy of object classes with N number of trees, where each tree node represents an object class. Non-leaf nodes are referred to as "containers" and do not contain data, while leaf nodes contain data. A wide variety of object class types may be defined by MDA schema definition files 124, depending upon the requirements of a particular application. For example, object classes may be defined for each component supported by router 102. Object classes may also be defined for attributes common to several components supported by router 102. For example, suppose that router 102 supports interfaces of types A, B and C. An object class is defined for each interface. An object class may also be defined for attributes that are common to all three interfaces. In this example, the tree defined by MDA schema definition files 124 includes a container node for interfaces. The container node for interfaces has four child leaf nodes, one for each interface A, B and C, and one for the common interface attributes. FIG. 2 is a block diagram that depicts a graphical representation 200 of this tree.

Table I below provides an example set of object class definitions contained in MDS schema definition files 124 for the "Interfaces"; "InterfaceA"; "InterfaceB" and "InterfacesCommon" classes from the prior example. Each class definition includes a class name, a parent class, a class category (container or leaf), a description and a pathname. The parent class is used to construct the trees and the pathname is used to define the location of the data on system DB 108. In the present example, the Interfaces class is a child container node of the RootCfg node, which is also depicted in FIG. 2. The InterfaceA, InterfaceB and InterfaceCommon classes are child leaf nodes of the Interfaces container node.

TABLE I class-name: "Interfaces",
parent-class: "RootCfg",
class-category: container,
description: "Interface configuration data",
pathname: "tb/ipd4-int/";
class-name: "InterfaceA",
parent-class: "Interfaces",
class-category: leaf,
description: "Configuration data for Interface A",
pathname: "";
value: (Range(1,ID_MAX) id_value "Identification value")
default-value: none;
class-name: "InterfaceB",
parent-class: "Interfaces",
class-category: leaf,
description: "Configuration data for Interface B",
pathname: "";
value: (Range(1,ID_MAX) id_value "Identification value")
default-value: none;
class-name: "InterfaceCommon",
parent-class: "Interfaces",
class-category: leaf,
description: "Common configuration data for Interfaces A and B",
pathname: "";
value: (Range(1,ADDRESS_MAX) address_value
 "Address Value for Interface A",
 (Range(1,ADDRESS_MAX) address_value
 "Address Value for Interface B",
default-value: none;

Table II below table provides an example of two other leaf classes defined by MDS schema definition files 124. Each leaf class definition specifies a class name, a parent class, a class category (leaf), a description, a pathname a value and a default value. The second leaf class "BGPDampening" includes five data types that together define the BGP dampening characteristics for this class.

TABLE II class-name: "BGPAsPathLoopcheck",
parent-class: "BGPAsAddressFamilyIndependent",
class-category: leaf,
description: "This specifies whether to enable AS-path loop checking for iBGP peers",
pathname: "ord_e/as-ibgp-loopcheck",
value: (Boolean true "Always set to TRUE"),
default-value: none;
class-name: "BGPDampening",
parent-class: "BGPAsAddressFamily",
class-category: leaf, TABLE II-continued description: "Enable route-flap dampening and specify its parameters",
pathname: "ord_g/dampening",
value: (Range(1,BGP_MAX_HALFLIFE) half life
"Half-life time for the penalty",
    Range(1,BGP_MAX_PENALTY) reuse
    "Value to start reusing a route",
    Range( 1,BGP_MAX_PENALTY) start
    "Value to start suppressing a route",
    Range(1,ff) max "Maximum duration to suppress a stable route",
    String name "route-map name"),
default-value: none;

MDA schema definition files 124 may be created manually for each component, for example, by a component developer. In this situation, the component developer determines the object classes and class attributes to be used in the hierarchical data model for router 102. The developer may start by defining the top-level container classes, followed by child container classes and then the leaf nodes containing data. The component developer then creates text files that contain the object classes and class attributes, for example using a text editor.

Alternatively, MDA schema definition files 124 may be generated, at least in part, based upon CLI definition files (.cmd files). CLI definition files are text files that define, for each component supported by router 102, the configuration command syntax, configuration command options and mappings of configuration commands to management data stored on router 102. The CLI definition files for a component may be processed by a conversion tool that generates a "first pass" or draft set of MDA schema definition files 124. In some situations, the first pass MDA schema definition files 124 may contain all of the information required by the MDA schema definition files 124. In other situations, the first pass MDA schema definition files 124 may need to be manually edited to supply additional information required by the MDA schema definition files 124 that could not be obtained from the CLI definition files. This may include, for example, making changes to class names and arguments, making changes to class hierarchies and adding information for help strings.

During the second step of the MDA design phase 122, MDA schema definition files 124 are processed by an MDA schema compiler 126 that generates both MDA schemas 128 and XML schemas 130. According to one embodiment of the invention, MDA schema compiler 126 generates an internal version of the MDA schema definition files 124 in the form of a parsed tree representation. The MDA schemas 128 and XML schemas 130 are then generated based upon the internal version of the MDA schema definition files 124. According to one embodiment of the invention, MDA schemas 128 are binary versions of MDS schema definition files 124 suitable for loading onto router 102, and are used by router 102 at runtime to process XML requests received from client 104. XML schemas 130 are text files that conform to the W3C schema standard for defining XML content. XML schemas 130 document for developers the external XML interface to router 102. XML schemas 130 are also used during the client design phase as described in more detail hereinafter.

Figure 3:
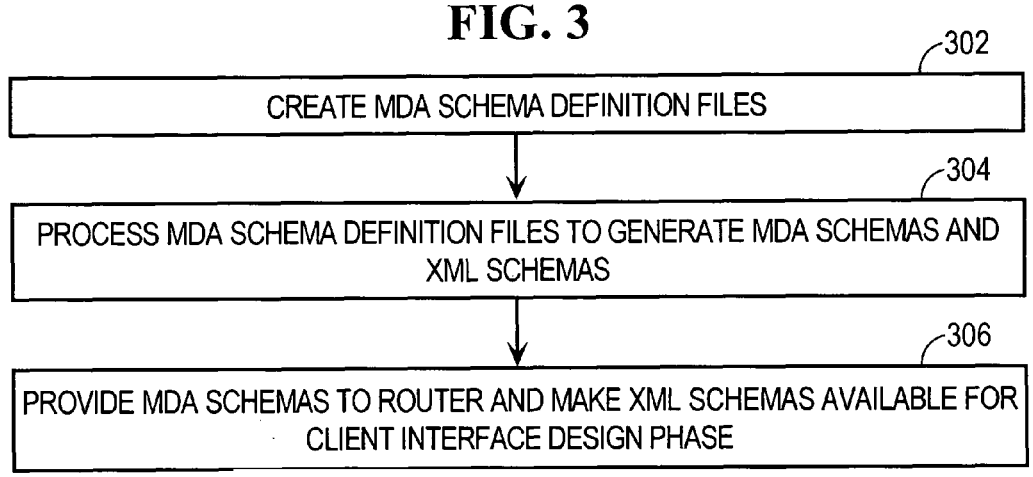
FIG. 3 is a flow diagram that depicts the high level steps performed during the MDA design phase.

FIG. 3 is a flow diagram 300 that depicts the high level steps performed during the MDA design phase 122. In step 302, MDA schema definition files 124 are created. As described herein, MDA schema definition files 124 may be created manually, by processing CLI command files, or a combination of processing CLI command files and manual editing.

In step 304, MDA schema definition files 124 are processed by MDA schema compiler 126 that generates both MDA schemas 128 and XML schemas 130. In step 306, MDA schemas 128 are provided to router 102 and XML schemas 130 are made available to the client interface design phase 132, specifically to both map file generator 134 and XML schema compiler 136.

IV. Client Interface Design Phase

The client interface design phase is graphically represented in FIG. 1 by the box identified by reference numeral 132. During the first step in the client interface design phase 132, XML schemas 130 are processed by both a map file generator 134 and an XML schema compiler 136. Map file generator 134 extracts attribute information from XML schemas 130 and generates a map file 138. Map file 138 is an XML file that contains a list of component properties and attributes for each of those properties. The attributes include information that indicates how each property is serialized and deserialized between client 104 and router 102. That is, how each property maps between a table-based data model used by client application 118 and the hierarchical data model used by router 102.

Table III below contains example contents of map file 138. As depicted in this example, map file 138 includes attributes for two properties of a component "IFCOMMON" that were obtained from XML schemas 130. The attributes include "XPath"; "Name"; DisplayName" and "Tooltip". The "XPath" attribute specifies an object in the hierarchical data model used by router 102 that contains the attribute values for the property. The "Name" attribute is used internally by client application 118. The "DisplayName" attribute is a name displayed on a graphical user interface (GUI) by client application 118. The "Tooltip" attribute is a character string used by client application 118 to provide additional information about properties to a user on a GUI.

TABLE III

<?xml version ="1.0" encoding ="UTF-8" ?>
<Component Name ="IFCOMMON" >
    <Property
        XPath="/InterfaceAllConfiguration/InterfaceConfiguration/
        Interface/Naming/Name"
        Name=""
        DisplayName=""
        Tooltip="Name of interface" />
    <Property
XPath="/InterfaceAllConfiguration/InterfaceConfiguration/
IPV4Network/Addresses/Primary/IPAddress"
        Name=""
        DisplayName=""
        Tooltip="IP address" />
</Component>

Map file 138 is edited by a developer to create a developer-edited map file 140. The developer may override the default attribute values contained in map file 138 that were obtained from the XML schemas 130. According to one embodiment of the invention, the generated map file 138 initially contains only the "XPath", "Name" and "DisplayName" attribute fields for each property. The developer may also add properties and attributes that were not generated from XML schemas 130.

XML schema compiler 136 processes XML schemas 130 and developer-edited map file 140 and generates a resource file 142. Resource file 142 is an XML file that contains a complete set of properties and corresponding attribute values for each component supported by router 102. The attribute values are all of the default values specified in XML schemas 130, except for those values that were overridden by a developer, as specified in developer-edited map file 140. Resource file 142 may also include properties and attributes that were added by a developer, as specified in developer-edited map file 140. Resource file 142 may also specify dependencies between properties. The dependencies may require, for example, that requests sent from client 104 to router 102 operate on multiple, dependent properties of a component. The data contained in resource file 142 is also referred to hereinafter as "metadata".

Appendix A contains an example of resource file 142. In this example, resource file 142 includes two records, identified as "RSVPInterfaceRecord" and "RSVPGeneralRecord". Each of these records has a set of properties and each property has a corresponding set of attributes. The use of resource file 142 is described in more detail hereinafter.

Figure 4:
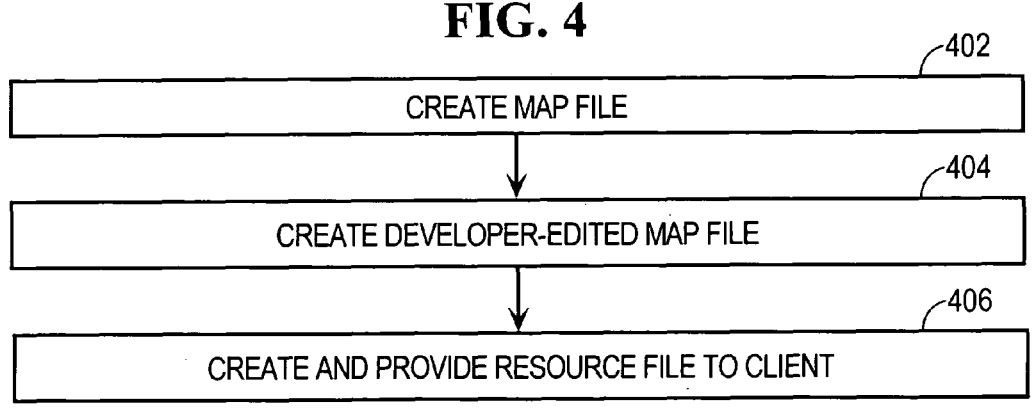
FIG. 4 is a flow diagram that depicts the high level steps performed during the client interface design phase.

FIG. 4 is a flow diagram 400 that depicts the high level steps performed during the client interface design phase 132. In step 402, map file generator 134 processes XML schemas 130 and generates map file 138. In step 404, a developer optionally edits map file 138 and creates the developer-edited map file 140. In step 406, XML schema compiler 136 generates resource file 142 from XML schemas 130 and developer-edited map file 140.

V. Client Runtime

At client runtime, metadata manager 120 processes the contents of resource file 142 and generates metadata that is managed by metadata manager 120. The metadata contains the same information as resource file 142, except that the metadata is in a lookup table format instead of the XML format of resource file 142. Metadata manager 120 stores the metadata locally and also provides an API that is used by SER/DES module 112, validation manager 114, application runtime 116 and client application 118 to access the metadata. For example, a Component Name, Record Name and Property Name may be used as a lookup key to request metadata. Once the metadata has been generated and the client processes are executing, client 104 can generate XML requests and process XML responses from router 102.

Figure 5:
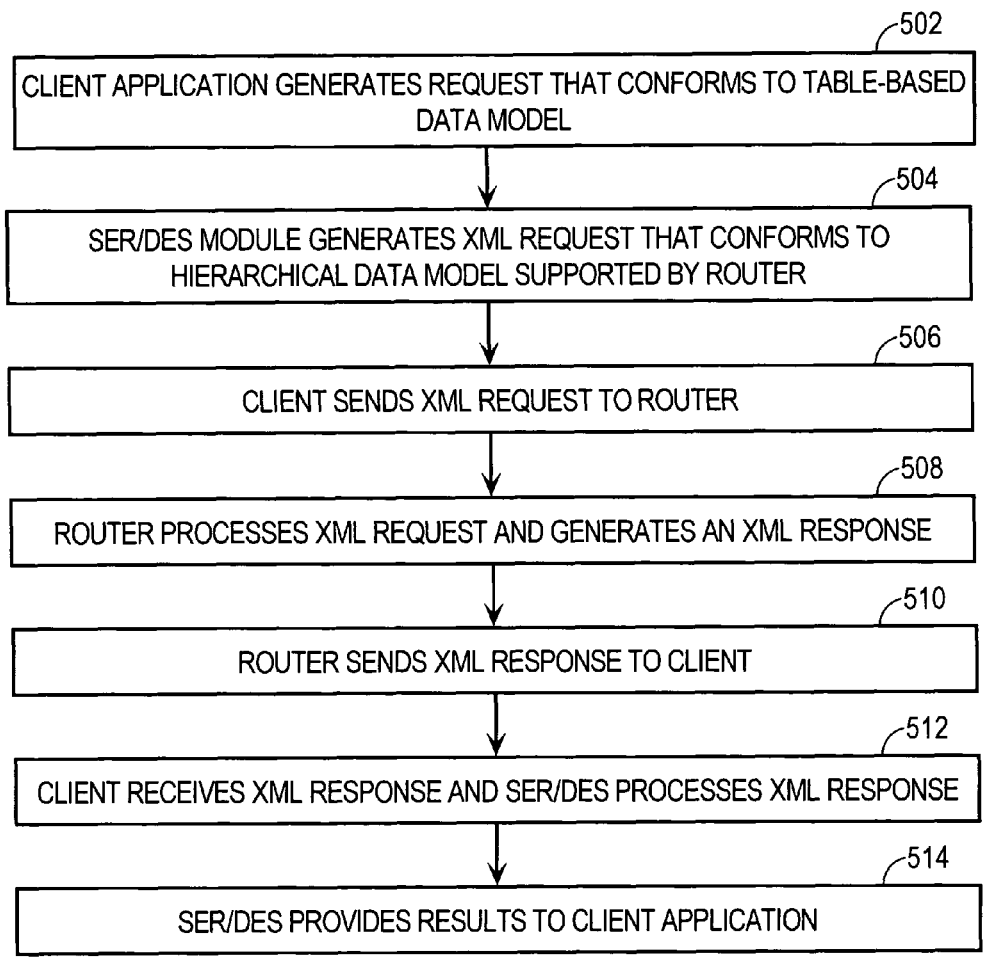
FIG. 5 is a flow diagram that depicts client side processing according to an embodiment of the invention.

Client side processing is now described with reference to a flow diagram 500 of FIG. 5. FIG. 5 depicts client side processing in the context of client application 118 requesting management data from router 102. In step 502, client application 118 generates a request that conforms to a table-based data model supported by client application 118. For example, parameters of the request are expressed in name/value pairs. In this example, the request is a request for management data from router 102. In other situations, the request may be a request to perform any type of operation. Example operations include, without limitation, requesting management data from router 102, setting values of management data on router 102 and requesting that updated management data be implemented by router 102. Client application 118 may be any type of application for managing router 102, depending upon the requirements of a particular application. In the present example, it is assumed that client application 118 is requesting management data from router 102 to be displayed for a user on a GUI.

In step 504, SER/DES module 112 serializes the validated request from client application 118. Serializing the validated request generally involves generating an XML request that conforms to the hierarchical data model supported by router 102 and as defined by resource file 142. SER/DES module 112 examines parameters contained in the validated request and requests XML tag information from metadata manager 120 for each parameter. XML tag information is requested by Component Name, Record Name and Property Name, depending upon the parameter. For example, suppose that the request from client application 118 requests all configuration data for the component named RSVP. SER/DES module 112 requests from metadata manager 120, the XML tag information for the component RSVP. SER/DES module 112 then generates an XML request for the configuration information for the component using the XML tag information provided by metadata manager 120. As another example, suppose that the request from client application 118 includes a parameter that corresponds to a particular property. In this situation, SER/DES module 112 requests the XML tag information from metadata manager 120 based upon the Component Name, Record Name and Property Name for the property.

In some situations, a single component has multiple records of configuration data. Therefore, according to one embodiment of the invention, in these situations, SER/DES module 112 generates an XML request for each record for the component. For example, as indicated in resource file 142 contained in Appendix A, there are two records defined for the RSVP component. These records are named "RSVPInterfaceRecord" and "RSVPGeneralRecord". Thus, in this situation, SER/DES module 112 generates two XML requests, one for each record. According to one embodiment of the invention, each XML request is generated based upon a "CommonPath" value for specified in the metadata for each record. Table IV below contains an example XML request generated by SER/DES module 112.

TABLE IV

<?xml version='1.0' encoding="UTF-8"?><Request><Get xmlns:xsi="http://www.w3.org/2001/XMLSchema-instance" ><Configuration><RSVP MajorVersion="1" MinorVersion="1"><InterfaceTable /></RSVP></Configuration></Get></Request>
<?xml version="1.0" encoding="UTF-8"?>

In step 506, client 104 sends the XML request to router 102 for processing. Router 102 processes the XML request and in step 508, generates an XML response. In step 510, router 102 sends the XML response to client 104.

In step 512, client 104 receives the XML response from router 102 and SER/DES module 112 "deserializes" the XML response. This generally involves the SER/DES module 112 transforming the data from the hierarchical data model supported by router 102 into the data table model supported by client application 118. The deserialization process is performed as follows. SER/DES module 112 extracts XML tags and data values from the response and consults the metadata to match the XML tags and data values with particular properties. The matching is done by comparing XML tags in the response to XML tags contained in the metadata, which are specified in the "XPath" values in the metadata.

For example, Table V below contains an example XML response from router 102. This response contains XML tags followed by values. In particular, the response contains an XML tag <Bandwidth><ReservableBandwidth> followed by the value 200000. Resource file 142 contains a property named "Reserved_BW" that has an XPath value of "/RSVP/InterfaceTAble/Interface/Bandwidth/ReservableBandwidth", of which the "/RSVP/InterfaceTAble/Interface" portion is the CommonPath. By matching this tag to the XPath for the "Reserved_BW" property, the 200000 value following the XML tag is the value for the "Reserved_BW" property.

In step 514, SER/DES module 112 provides this value to client application 118 along with an indication that the value corresponds to the "Reserved_BW" property. Client application 118 stores the value in a data table using the lookup key associated with the "Reserved_BW" property for the record named "RSVPInterfaceRecord" for the RSVP component.

fies that the Max_Flow value must be an "UnsignedInt", i.e., an unsigned integer value. Validation manager 114 verifies

TABLE V

<Response MajorVersion ="1" MinorVersion ="0"><Get xmlns :xsi=
"http://www.w3.org/2001
/XMLSchema-instance"><Configuration><RSVP MajorVersion="1"
MinorVersion="1"><InterfaceTable><Interface><Naming><Name>POS
0/2/0/0</Name></Naming><Enable>true</
Enable><Bandwidth><ReservableBandwidth>20
0000</ReservableBandwidth><MaxFlow>20000</
MaxFlow><SubPool
xsi:nil="true"/></Bandwidth><IfSignalling><RefreshInterval>10</RefreshInterval></If-
Sign
alling></Interfa
ce><Interface><Naming><Name>POS0/3/0/0</Name></Naming><Enable>true</En-
able><
Bandwidth><ReservableBandwidth>200000</Reser
vableBandwidth><MaxFlow>20000</MaxFlow><SubPool
xsi:nil="true"/></Bandwidth><IfSignalling><RefreshInterval>10</RefreshIn
terval></IfSignalling></Interface></InterfaceTable></RSVP></Configuration></Get></
Res
ponse>

Client application 118 may then process the results from the response. Client application 118 may request metadata from metadata manager 120 for displaying on a GUI. For example, suppose that client application 118 has requested the attributes for the "Max_Flow" property of the RSVP component. One of the attributes of this property is "DisplayName" and has a value of "Max. flow (kbps)". Client application 118 displays "Max. flow (kbps)" on a GUI as a label for the Max_Flow data value. Application runtime 116 is configured to handle the formation of records and setting and getting of name/value pairs from resource file 142.

As illustrated by this example, client application 118 does not have to be "XML aware." This means that client application 118 does not have to be aware of the specific XML tags or exactly how the hierarchical data model used by router 102 is organized. Instead, client application 118 operates using a data table model and the SER/DES module 112 handles generating XML requests that are sent to router 102 and XML replies that are received from router 102. In addition, resource file 142 can be re-generated to reflect changes to MDA schema definition files 124 without necessarily affecting client application 118.

Validation manager 114 provides client-side validation for client application 118. This is used, for example, when a user is specifying management data values through a GUI. Client application 118 requests that validation manager 114 validate the values entered by the user. To perform the validation, validation manager 114 requests metadata from metadata manager 120 that validation manager 114 needs to validate the data. Validation manager 114 may perform different types of validation, such type checking and range checking, depending upon the attributes for a property and the requirements of a particular application.

Referring to the example resource file 142 in Appendix A, suppose that a user enters a value for the minimum value (MinValue) attribute for the Max_Flow property for the RSVP interface. Validation manager 114 requests the "Max_Flow" property attributes of the RSVP interface from metadata manager 120. The request by validation manager 114 specifies the "RSVP" component, the "RSVPInterfaceRecord" and the "Max_Flow" property. Metadata manager 120 provides all of the attribute values of the "Max_Flow" property to validation manager 114. Validation manager 114 then uses the attribute values to validate the value entered by the user. For example, the value of the "Type" attribute speciwhether the value specified by the user is an unsigned integer value. If not, then validation manager 114 indicates to client application 118 that the entered value is not valid. The values for the "MinValue" and "MaxValue" attributes specify the valid range of the value, which may also be validated in a manner similar to the type checking validation just described. Metadata may also contain "validators," or data that allows a developer to specify custom validation logic to be executed. When encountering a particular validator in metatdata, validation manager 114 executes validation logic corresponding to the particular validator.

In addition to validation data, the metadata created and maintained by metadata manager 120 may include other information that is useful to client application 118. According to one embodiment of the invention, the metadata includes additional data that may be displayed by client application 118 on a GUI to enhance the user experience. For example, resource file 142 data contained in Appendix A includes a "Tooltip" attribute for some properties. The value of the "Tooltip" attribute is a string that provides a description of a property. Client application 118 may request the value of the "Tooltip" attribute for certain properties and then display the string on a GUI next to the property. The particular manner in which client application 118 is configured to display the "Tooltip" string may vary depending upon the requirements of a particular application. For example, in response to detecting that a pointing device such as a mouse or cursor has been moved by a user to within a specified area on a GUI associated with a particular property, client application 118 causes the "Tooltip" string to be displayed on the GUI to provide additional information about the property.

VI. Router Runtime

Figure 6:
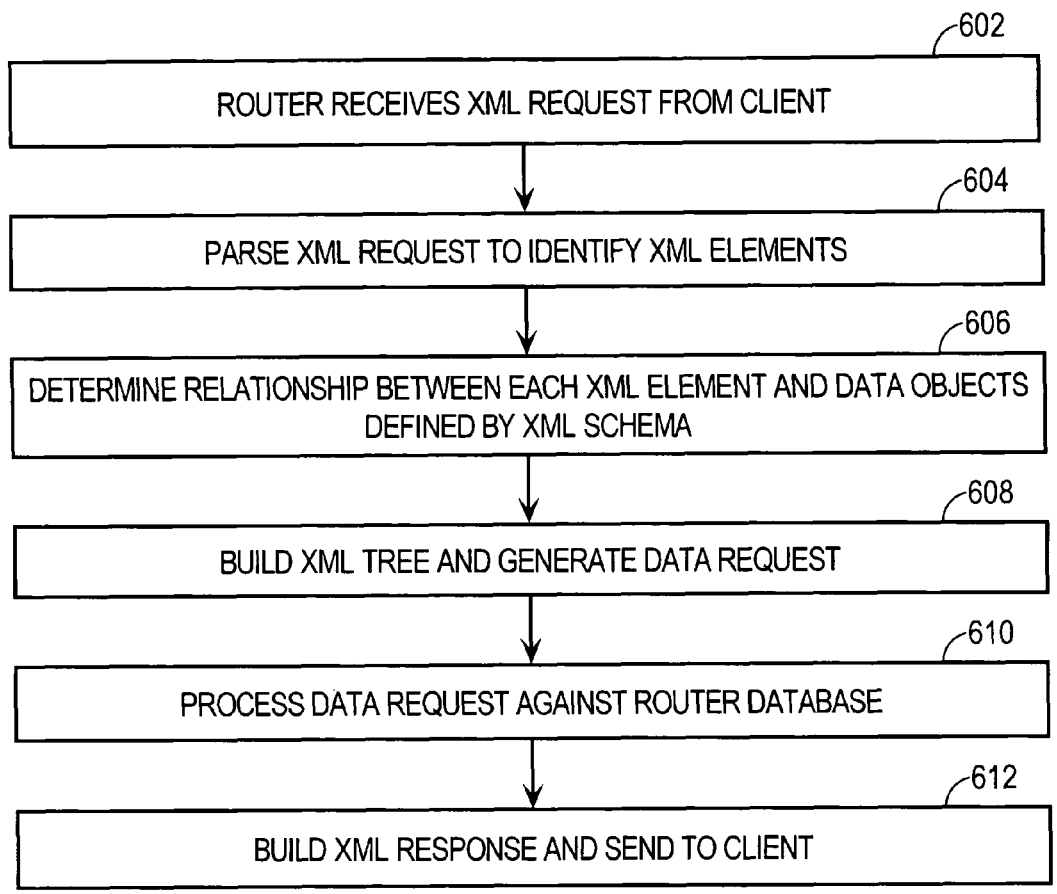
FIG. 6 is a flow diagram that depicts server (router) side processing according to an embodiment of the invention.

Server side processing is now described with reference to a flow diagram 600 of FIG. 6. FIG. 6 depicts high level server side processing in the context of router 102 processing an XML request from client 104. In step 602, router 102 receives an XML request from client 104. In step 604, the XML request is parsed to identify XML elements contained in the request. For example, the XML request may be examined to identify XML tags contained therein. In step 606, a relationship is determined between each XML element and data objects defined by MDA schemas 128. This may include, for example, identifying management data items maintained in system DB 108 by router 102 that correspond to the XML tags contained in the XML request. In step 608, an XML tree is built and one or more data requests generated and provided to MDS schema server 106. The data requests specify operations to be performed on the identified data items that correspond to the XML tags. In step 610, the data requests are processed against system DB 108. In step 612, an XML response is generated by router 102 and provided to client 104. The XML response may contain management data requested by client 104. The XML response may instead contain a confirmation that the requested operation has been performed. For example, the XML response may contain a confirmation that management data has been updated on router 102. As another example, the XML response may contain a confirmation that updated management data has been implemented by router 102. This may be provided, for example, in response to a request to commit changes to management data on router 102.

VII. Other Services

According to one embodiment of the invention, the XML-based management architecture may support other services. As depicted in FIG. 1, router 102 includes a configuration manager 144 configured to provide advanced configuration services. Example configuration services include, without limitation, lock management services and commit services to support a two-phase commit protocol for updating data on system DB 108. For example, client 104 may update configuration data and then provide the updated configuration data to router 102 that stores, but does not implement, the updated configuration data. Client 104 then issues a commit command to router 102 and router 102 implements the updated configuration data. This may involve the use of a lock management service to ensure that in multi-client applications, that only one client at a time can control implementing updated configuration data.

VIII. Implementation Mechanisms

Although embodiments of the invention have been described herein in the context of routers, the approaches described herein are applicable to any type of network device. Furthermore, although embodiments of the invention have been described herein in the context of XML, the approaches described herein are applicable to other markup languages.

The approach described herein for developing and maintaining network device management applications is a generic, automated solution that provides a consistent management API for all components across a network device. Once the MDA schema definition files 124 have been created for the components on a network device, the API can be automatically generated. This reduces the amount of knowledge that component developers must have about how data is stored on system DB 108. The approach also reduces the amount of time and resources that are required to implement changes to component data models and to client application since a consistent interface structure is provided. Once the MDA schema definition files 124 have been updated to reflect the changes, the MDA schemas 128 and XML schemas 130 can be regenerated and use to rebuild the management applications.

Figure 7:
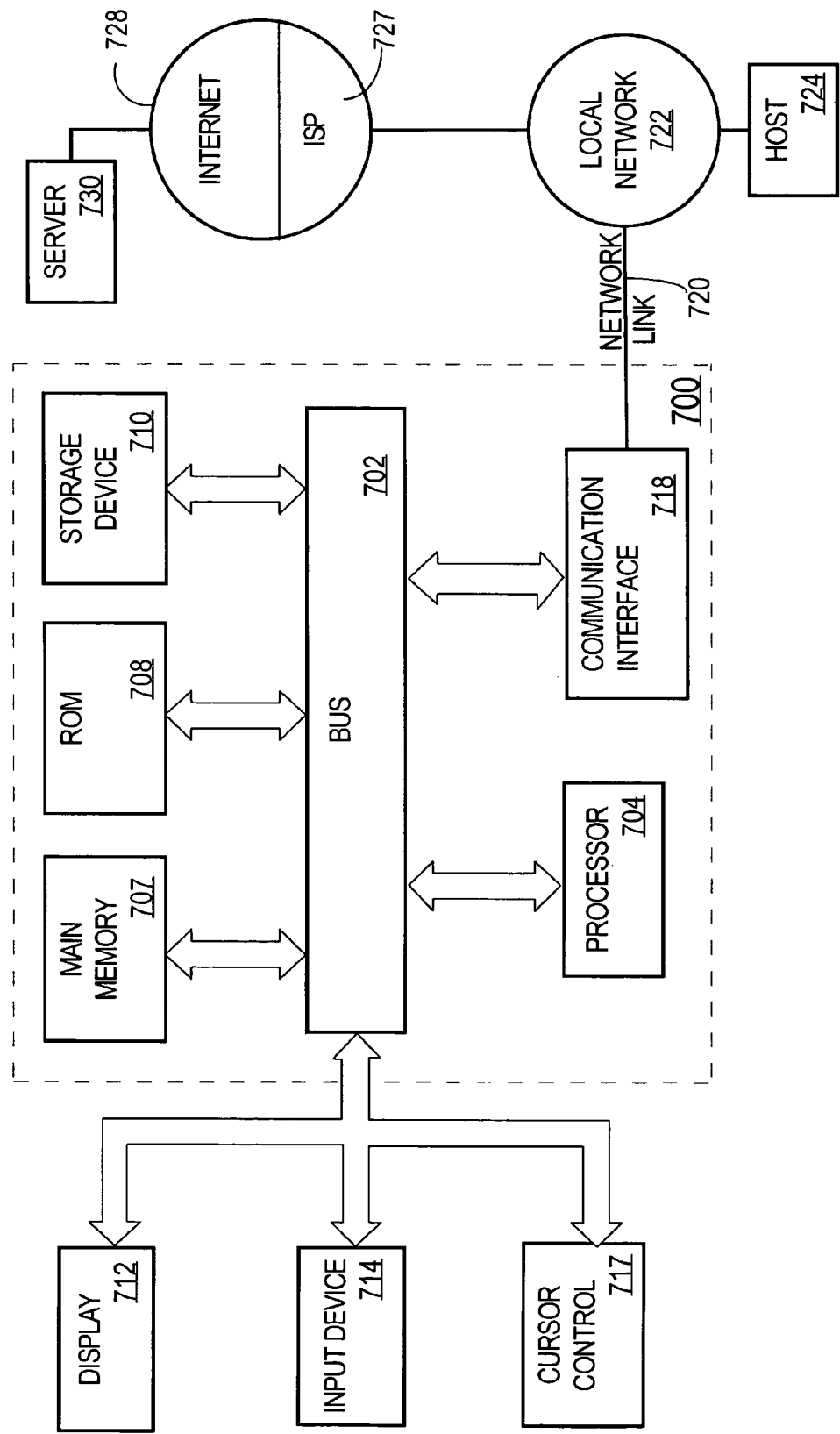
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

Processor 704 may execute the code as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

EXAMPLE RESOURCE FILE

```
<?xml version="1.0" encoding="UTF-8" ?>
-<Component Name="RSVP">
  -<Record Name="RSVPInterfaceRecord"
    CommonPath="/RSVP/InterfaceTable/Interface" Type="Vector">
    <Property Name="Interface_Name"
      XPath="/RSVP/InterfaceTable/Interface/Naming/Name"
      Type="Interface" RelativePath="/Naming/Name"
```

APPENDIX A-continued

EXAMPLE RESOURCE FILE

```
      DisplayName="Interface Name" Key="true" Required="true"
      Visible="true" Serializable="true" Tooltip="Name of interface" />
    <Property Name="Running"
      XPath="/RSVP/InterfaceTable/Interface/Enable" Type="Boolean"
      RelativePath="/Enable" Required="true" FixedValue="true"
      Visible="false" Serializable="true" Tooltip="Enabled or
      disabled" />
    <Property Name="Reserved_BW"
      XPath="/RSVP/InterfaceTable/Interface/Bandwidth/Reservable
      Bandwidth" Type="UnsignedInt"
      RelativePath="/Bandwidth/ReservableBandwidth"
      DisplayName="Reserved BW (kbps)" Nillable="true"
      MinValue="0"
      MaxValue="10000000" Visible="true" Serializable="true"
      Tooltip="Reservable bandwidth (Kilo bits/sec)" />
    <Property Name="Max_Flow"
      XPath="/RSVP/InterfaceTable/Interface/Bandwidth/MaxFlow"
      Type="UnsignedInt" RelativePath="/Bandwidth/MaxFlow"
      DisplayName="Max. flow (kbps)" Nillable="true" MinValue="0"
      MaxValue="10000000" Visible="true" Serializable="true"
      Tooltip="Largest reservable flow (Kilo bits/sec)" />
    <Property Name="Sub_Pool"
      XPath="/RSVP/InterfaceTable/Interface/Bandwidth/SubPool"
      Type="UnsignedInt" RelativePath="/Bandwidth/SubPool"
      DisplayName="Sub Pool (kbps)" Nillable="true" MinValue="0"
      MaxValue="10000000" Visible="true" Serializable="true"
      Tooltip="Reservable bandwidth in sub-pool (Kilo bits/sec)" />
    <Property Name="DSCP"
      XPath="/RSVP/InterfaceTable/Interface/IfSignalling/DSCP"
      Type="UnsignedInt" RelativePath="/IfSignalling/DSCP"
      DisplayName="Override with value" MinValue="0"
      MaxValue="63"
      Visible="true" Serializable="true" Tooltip="Differentiated
      Services
      Code Point (DSCP)" />
    <Property Name="Limit_Sgn_Msg_Rt"
      XPath="/RSVP/InterfaceTable/Interface/IfSignalling/Pacing"
      Type="Boolean" RelativePath="/IfSignalling/Pacing"
      DisplayName="Limit Signalling Message Rate"
      FixedValue="true"
      Visible="false" Serializable="true" Tooltip="none" />
    <Property Name="Num_Msg"
      XPath="/RSVP/InterfaceTable/Interface/IfSignalling/
      IntervalRate/Mess
      agesPerInterval" Type="UnsignedInt"
      RelativePath="/IfSignalling/IntervalRate/MessagesPerInterval"
      DisplayName="Number of messages" Nillable="true"
      DefaultValue="100" MinValue="1" MaxValue="500"
      Visible="true"
      Serializable="true" Tooltip="Number of messages to be sent per
      interval" />
    <Property Name="Interval"
      XPath="/RSVP/InterfaceTable/Interface/IfSignalling/
      IntervalRate/Interv
      alSize" Type="UnsignedInt"
      RelativePath="/IfSignalling/IntervalRate/IntervalSize"
      DisplayName="Interval (ms)" Nillable="true"
      DefaultValue="1000"
      MinValue="250" MaxValue="2000" Visible="true"
      Serializable="true"
      Tooltip="Size of an interval (milliseconds)" />
    <Property Name="Msg_Interval"
      XPath="/RSVP/InterfaceTable/Interface/IfSignalling/
      RefreshInterval"
      Type="UnsignedInt" RelativePath="/IfSignalling/
      RefreshInterval"
      DisplayName="Message interval (sec)" DefaultValue="45"
      MinValue="10" MaxValue="180" Visible="true"
      Serializable="true"
      Tooltip="Refresh interval (seconds)" />
    <Property Name="Missed_Msg"
      XPath="/RSVP/InterfaceTable/Interface/
      IfSignalling/MissedMessages"
      Type="UnsignedInt" RelativePath="/IfSignalling/
      MissedMessages"
      DisplayName="Missed message limit" DefaultValue="4"
      MinValue="1" MaxValue="8" Visible="true" Serializable="true"
      Tooltip="Number of Messages" />
```

APPENDIX A-continued

EXAMPLE RESOURCE FILE

```
<Property Name="Limit_Sgn_Msg_Rt_CheckBox" Type="Boolean"
    DisplayName="Limit Signalling Message Rate"
    DefaultValue="false"
    Visible="true" Serializable="false" Tooltip="Limit the
    rate of RSVP
    signalling messages being sent out on the interface" />
<Property Name="Refresh_Reduction"
    XPath="/RSVP/InterfaceTable/Interface/IfSignalling/
    RefreshReduction/
    Disable" Type="Boolean"
    RelativePath="/IfSignalling/RefreshReduction/Disable"
    DisplayName="Enable Refresh Reduction" FixedValue="true"
    Visible="false" Serializable="true" Tooltip="none" />
<Property Name="Refresh_Reduction_CheckBox" Type="Boolean"
    DisplayName="Enable Refresh Reduction" DefaultValue="true"
    Visible="true" Serializable="false" Tooltip="Configure refresh
    reduction options" />
<Property Name="ACK_Hold_Time"
    XPath="/RSVP/InterfaceTable/Interface/IfSignalling/
    RefreshReduction/
    ReliableAckHoldTime" Type="UnsignedInt"
    RelativePath="/IfSignalling/RefreshReduction/
    ReliableAckHoldTime"
    DisplayName="ACK hold time (ms)" DefaultValue="400"
    MinValue="100" MaxValue="5000" Visible="true"
    Serializable="true"
    Tooltip="ACK message hold time (milliseconds)" />
<Property Name="Max_ACK_Size"
    XPath="/RSVP/InterfaceTable/Interface/IfSignalling/
    RefreshReduction/
    ReliableAckMaxSize" Type="UnsignedInt"
    RelativePath="/IfSignalling/RefreshReduction/
    ReliableAckMaxSize"
    DisplayName="Max ACK size (bytes)" DefaultValue="4096"
    MinValue="20" MaxValue="65000" Visible="true"
    Serializable="true"
    Tooltip="Max size of an ACK message (bytes)" />
<Property Name="Retransmit_time"
    XPath="/RSVP/InterfaceTable/Interface/IfSignalling/
    RefreshReduction/
    ReliableRetransmitTime" Type="UnsignedInt"
    RelativePath="/IfSignalling/RefreshReduction/
    ReliableRetransmitTime
    " DisplayName="Retransmit time (ms)" DefaultValue="900"
    MinValue="100" MaxValue="10000" Visible="true"
    Serializable="true" Tooltip="Min time before RSVP messages
    retransmit (milliseconds)" />
<Property Name="SRefresh"
    XPath="/RSVP/InterfaceTable/Interface/IfSignalling/
    RefreshReduction/
    ReliableSRefresh" Type="Boolean"
    RelativePath="/IfSignalling/RefreshReduction/
    ReliableSRefresh"
    DisplayName="Enable summary refresh" DefaultValue="false"
    FixedValue="true" Visible="false" Serializable="true"
    Tooltip="none"
    />
<Property Name="SRefresh_CheckBox" Type="Boolean"
    DisplayName="Enable Summary Refresh" DefaultValue="false"
    Visible="true" Serializable="false" Tooltip="Configure
    summary refresh for reliable messaging" />
<Property Name="Sum_Msg"
    XPath="/RSVP/InterfaceTable/Interface/
    IfSignalling/RefreshReduction/
    DisableSummary" Type="Boolean"
    RelativePath="/IfSignalling/RefreshReduction/DisableSummary"
    DisplayName="Enable summary messaging" FixedValue="true"
    Visible="false" Serializable="true" Tooltip="none" />
<Property Name="Sum_Msg_CheckBox" Type="Boolean"
    DisplayName="Enable Summary Messaging"
    DefaultValue="true"
    Visible="true" Serializable="false" Tooltip="Configure
    summary refresh options" />
<Property Name="Max_Msg_Size"
    XPath="/RSVP/InterfaceTable/Interface/IfSignalling/
    RefreshReduction/
    SummaryMaxSize" Type="UnsignedInt"
    RelativePath="/IfSignalling/RefreshReduction/SummaryMaxSize"
    DisplayName="Max message size (bytes)" DefaultValue="4096"
    MinValue="20" MaxValue="65000" Visible="true"
    Serializable="true"
    Tooltip="Max size (bytes)" />
-<PropertyGroup Name="/RSVP/InterfaceTable/
Interface/Bandwidth"
        Type="PackedTupple">
    <Property Name="Reserved_BW" />
    <Property Name="Max_Flow" />
    <Property Name="Sub_Pool" />
    <Validator Name="/RSVP/InterfaceTable/Interface/Bandwidth"
        Type="PackedTupple" />
</PropertyGroup>
-<PropertyGroup
    Name="/RSVP/InterfaceTable/Interface/IfSignalling/IntervalRate"
    Type="PackedTupple">
    <Property Name="Num_Msg" />
    <Property Name="Interval" />
    <Validator
        Name="/RSVP/InterfaceTable/Interface/IfSignalling/IntervalRate"
        Type="PackedTupple" />
</PropertyGroup>
-<VersionInfo>
    <VersionedClass XPath="/RSVP" MajorVersion="1"
        MinorVersion="1" />
</VersionInfo>
</Record>
-<Record Name="RSVPGeneralRecord" CommonPath=
"/RSVP/Signalling"
        Type="Scalar">
    <Property Name="GR_Enable"
        XPath="/RSVP/Signalling/GracefulRestart/Enable"
        Type="Boolean"
        RelativePath="/GracefulRestart/Enable" DisplayName="Enable
        Graceful Restart"FixedValue="true" Visible="true"
        Serializable="true"
        Tooltip="Enable RSVP graceful restart" />
    <Property Name="GR_RestartTime"
        XPath="/RSVP/Signalling/GracefulRestartfRestartTime"
        Type="UnsignedInt" RelativePath="/GracefulRestart/RestartTime"
        DisplayName="Graceful Restart Time (secs)" DefaultValue="60"
        MinValue="60" MaxValue="3600" Visible="true"
        Serializable="true"
        Tooltip="Graceful restart time (seconds)" />
    <Property Name="Hello_GRInterval"
        XPath="/RSVP/Signalling/HelloGracefulRestartInterval"
        Type="UnsignedInt" RelativePath="/HelloGracefulRestartInterval"
        DisplayName="Graceful Restart Hello Interval (millisecs)"
        DefaultValue="5000" MinValue="3000" MaxValue="10000"
        Visible="true" Serializable="true" Tooltip="Hello interval
        (milliseconds)" />
    <Property Name="Hello_GRMisses"
        XPath="/RSVP/Signalling/HelloGracefulRestartMisses"
        Type="UnsignedInt" RelativePath="/HelloGracefulRestartMisses"
        DisplayName="Graceful Restart Max. Missed Messages"
        DefaultValue="3" MinValue="1" MaxValue="5" Visible="true"
        Serializable="true" Tooltip="Number of messages" />
-<VersionInfo>
    <VersionedClass XPath="/RSVP" MajorVersion="1"
        MinorVersion="1" />
</VersionInfo>
</Record>
</Component>
```

What is claimed is:

1. A computer-implemented method for requesting a router to perform an operation on management data maintained by the router, the method comprising computer-implemented steps of:

generating, at a client, an XML file that comprises XML tag information that corresponds to attribute values for each property of a plurality of properties for one or more components that are supported by the router, wherein the XML file is generated based in part on command line interface (CLI) definition files corresponding to each of the one or more components;

receiving, at the client from a client application, a non-XML request that conforms to a table-based data model to perform an operation on management data maintained by the router;

examining one or more parameters contained in the non-XML request and retrieving the XML tag information that corresponds to the one or more parameters, wherein the XML tag information is retrieved from the XML file;

generating an XML request that specifies the operation to be performed on the management data maintained by the router and identified in the non-XML request, and that specifies that the router provide, based upon the retrieved XML tag information, values that correspond to the one or more parameters;

sending the XML request to the router;

in response to receiving, at the client, an XML response from the router, extracting, from the XML response, one or more XML tags and the values that correspond to the one or more parameters and are associated with the extracted XML tags;

in response to the non-XML request, providing to the client application the values associated with the extracted XML tags and the corresponding one or more parameters.

2. The method as recited in claim 1, wherein retrieving the XML tag information that corresponds to the one or more parameters comprising requesting, from a metadata manager, metadata that specifies the XML tag information that corresponds to the one or more parameters.

3. The method as recited in claim 1, further comprising computer-implemented steps of: requesting metadata that specifies valid attribute types for the one or more parameters; and validating the one or more parameters based upon the metadata.

4. The method as recited in claim 1, further comprising computer-implemented steps of: requesting metadata that specifies valid values for the one or more parameters; and validating the one or more parameters based upon the metadata.

5. The method as recited in claim 1, wherein determining the one or more parameters that corresponds to the extracted XML tags comprising matching the extracted XML tags with the XML tags contained in the XML file.

6. The method as recited in claim 1, further comprising computer-implemented steps of:

receiving, at a client, a set of XML schemas that is generated based in part on command line interface (CLI) definition files corresponding to each of one or more components that are supported by the router;

extracting, from the set of XML schemas, one or more default attribute values for each property of a plurality of properties for one or more components supported by the router;

receiving one or more attribute values that overrides the one or more default attribute values from the set of XML schemas; and generating, at the client, an XML file based on the one or more default attribute values extracted from the set of XML schemas and the one or more attribute values that overrides the one or more default attribute values, wherein the XML file comprises attribute values for each property of a plurality of properties for the one or more components that are supported by the router, and XML tag information that corresponds to attribute values for each property of a router component.

7. A non-transitory computer-readable storage medium for requesting a router to perform an operation on management data maintained by the router, the computer-readable storage medium carrying instructions, wherein the instructions executed by one or more processors, cause the one or more processors to perform the steps of:

generating, at a client, an XML file that comprises XML tag information that corresponds to attribute values for each property of a plurality of properties for one or more components that are supported by the router, wherein the XML file is generated based in part on command line interface (CLI) definition files corresponding to each of the one or more components;

receiving, at the client from a client application, a non-XML request that conforms to a table-based data model to perform an operation on management data maintained by the router;

examining one or more parameters contained in the non-XML request and retrieving the XML tag information that corresponds to the one or more parameters, wherein the XML tag information is retrieved from the XML file;

generating an XML request that specifies the operation to be performed on the management data maintained by the router and identified in the non-XML request, and that specifies that the router provide, based upon the retrieved XML tag information, values that that correspond to the one or more parameters;

sending the XML request to the router in response to receiving, at the client, an XML response from the router, extracting, from the XML response, one or more XML tags and the values that correspond to the one or more parameters and are associated with the extracted XML tags;

in response to the non-XML request, providing to the client application the values associated with the extracted XML tags and the corresponding one or more parameters.

8. The computer-readable storage medium as recited in claim 7, wherein retrieving the XML tag information that corresponds to the one or more parameters comprising requesting, from a metadata manager, metadata that specifies the XML tag information that corresponds to the one or more parameters.

9. The computer-readable storage medium as recited in claim 7, further comprising one or more additional instructions, wherein the additional instructions executed by the one or more processors, cause the one or more processors to perform the steps of: requesting metadata that specifies valid attribute types for the one or more parameters; and validating the one or more parameters based upon the metadata.

10. The computer-readable storage medium as recited in claim 7, further comprising one or more additional instructions, wherein the additional instructions executed by the one or more processors, cause the one or more processors to perform the steps of: requesting metadata that specifies valid values for the one or more parameters; and validating the one or more parameters based upon the metadata.

11. The computer-readable storage medium as recited in claim 7, wherein determining the one or more parameters that corresponds to the extracted XML tags comprising matching the extracted XML tags with the XML tags contained in the metadata.

12. The computer-readable storage medium as recited in claim 7, further comprising one or more additional instructions, wherein the additional instructions executed by one or more processors, cause the one or more processors to perform the steps of:

receiving, at a client, a set of XML schemas that is generated based in part on command line interface (CLI) definition files corresponding to each of one or more components that are supported by the router;

extracting, from the set of XML schema, one or more default attribute values for each property of a plurality of properties for the one or more components supported by the router;

receiving one or more attribute values that overrides the one or more default attribute values from the set of XML schemas; and generating, at the client, an XML file based on the one or more default attribute values extracted from the set of XML schemas and the one or more attribute values that overrides the one or more default attribute values, wherein the XML file comprises attribute values for each property of a plurality of properties for the one or more components that are supported by the router, and XML tag information that corresponds to attribute values for each property of a router component.

13. An apparatus for requesting a router to perform an operation on management data maintained by the router, the apparatus comprising a memory storing instructions, wherein the instructions executed by one or more processors, cause the one or more processors to perform the steps of:

generating, at a client, an XML file that comprises XML tag information that corresponds to attribute values for each property of a plurality of properties for one or more components that are supported by the router, wherein the XML file is generated based in part on command line interface (CLI) definition files corresponding to each of the one or more components;

receiving, at the client from a client application, a non-XML request that conforms to a table-based data model to perform an operation on management data maintained by the router;

examining one or more parameters contained in the non-XML request and retrieving the XML tag information that corresponds to the one or more parameters, wherein the XML tag information is retrieved from the XML file;

generating an XML request that specifies the operation to be performed on the management data maintained by the router and identified in the non-XML request, and that specifies that the router provide, based upon the retrieved XML tag information, values that that correspond to the one or more parameters;

sending the XML request to the router;

in response to receiving, at the client, an XML response from the router, extracting, from the XML response, one or more XML tags and the values that correspond to the one or more parameters and are associated with the extracted XML tags;

in response to the non-XML request, providing to the client application the values associated with the extracted XML tags and the corresponding one or more parameters.

14. The apparatus as recited in claim 13, wherein retrieving the XML tag information that corresponds to the one or more parameters comprising requesting, from a metadata manager, metadata that specifies the XML tag information that corresponds to the one or more parameters.

15. The apparatus as recited in claim 13, wherein the memory further comprises one or more additional instructions, wherein the additional instructions executed by the one or more processors, cause the one or more processors to perform the steps of: requesting metadata that specifies valid attribute types for the one or more parameters; and validating the one or more parameters based upon the metadata.

16. The apparatus as recited in claim 13, wherein the memory further comprises one or more additional instructions, wherein the additional instructions executed by the one or more processors, cause the one or more processors to perform the steps of: requesting metadata that specifies valid values for the one or more parameters; and validating the one or more parameters based upon the metadata.

17. The apparatus as recited in claim 13, wherein determining the one or more parameters that corresponds to the extracted XML tags comprising matching the extracted XML tags with the XML tags contained in the metadata.

18. The apparatus as recited in claim 13, wherein the memory further comprising one or more additional instructions, wherein the additional instructions executed by one or more processors, cause the one or more processors to perform the steps of:

receiving, at a client, a set of XML schemas that is generated based in part on command line interface (CLI) definition files corresponding to each of one or more components that are supported by the router;

extracting, from the set of XML schemas, one or more default attribute values for each property of a plurality of properties for the one or more components supported by the router;

receiving one or more attribute values that overrides the one or more default attribute values from the set of XML schemas; and generating, at the client, an XML file based on the one or more default attribute values extracted from the set of XML schemas and the one or more attribute values that overrides the one or more default attribute values, wherein the XML file comprises attribute values for each property of a plurality of properties for the one or more components that are supported by the router, and XML tag information that corresponds to attribute values for each property of a router component.

* * * * *